United States Patent
Gocek et al.

(10) Patent No.: US 9,361,333 B2
(45) Date of Patent: *Jun. 7, 2016

(54) REDUCING LOCK OCCURRENCES IN SERVER/DATABASE SYSTEMS

(71) Applicant: International Business Machines Corporation, Armonk, NY (US)

(72) Inventors: Pawel Gocek, Lodz (PL); Grzegorz K. Lech, Cieszyn (PL); Bartlomiej T. Malecki, Slomniki (PL); Jan Marszalek, Cracow (PL); Joanna Wawrzyczek, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 54 days.

This patent is subject to a terminal disclaimer.

(21) Appl. No.: 14/474,488

(22) Filed: Sep. 2, 2014

(65) Prior Publication Data

US 2014/0372397 A1 Dec. 18, 2014

Related U.S. Application Data

(63) Continuation of application No. 13/964,429, filed on Aug. 12, 2013, now Pat. No. 9,244,966.

(30) Foreign Application Priority Data

Oct. 30, 2012 (GB) .................................. 1219442.9

(51) Int. Cl.
*G06F 17/30* (2006.01)
*G06F 9/52* (2006.01)

(52) U.S. Cl.
CPC .......... *G06F 17/30362* (2013.01); *G06F 9/526* (2013.01); *G06F 17/30168* (2013.01)

(58) Field of Classification Search
None
See application file for complete search history.

(56) References Cited

U.S. PATENT DOCUMENTS

| 6,052,731 A | 4/2000 | Holdsworth et al. |
| 6,742,016 B1 | 5/2004 | Bhoj et al. |
| 6,763,520 B1 | 7/2004 | Seeds |

(Continued)

FOREIGN PATENT DOCUMENTS

GB 2507484 A 5/2014

OTHER PUBLICATIONS

Kang et al., "Chronos: Feedback Control of a Real Database System Performance", 28th IEEE International Real-Time Systems Symposium, 2007, pp. 267-276.

(Continued)

*Primary Examiner* — Hung Le
(74) *Attorney, Agent, or Firm* — L. Jeffrey Kelly; David Zwick

(57) ABSTRACT

Limiting the number of concurrent requests in a database system. Arranging requests to be handled by the database system in at least one queue. Defining a maximum value (SS) of concurrent requests corresponding to the at least one queue. Monitoring at least one queue utilization parameter corresponding to the at least one queue and calculating a performance value based on the at least one queue utilization parameter. Adapting the maximum value (SS) of concurrent requests of the at least one queue dynamically based on the performance value (PF) in order to improve system performance. Limiting the number of concurrent requests of the at least one queue dynamically based on the dynamically adapted maximum value (SS).

16 Claims, 5 Drawing Sheets

(56) References Cited

U.S. PATENT DOCUMENTS

| | | | |
|---|---|---|---|
| 6,965,896 B1 | 11/2005 | Shedden | |
| 7,617,201 B1 | 11/2009 | Bedell et al. | |
| 8,924,981 B1 | 12/2014 | Brown et al. | |
| 2002/0016839 A1* | 2/2002 | Smith | G06Q 40/00 709/224 |
| 2003/0156547 A1 | 8/2003 | Peleg | |
| 2003/0182261 A1 | 9/2003 | Patterson | |
| 2006/0074937 A1 | 4/2006 | Bird et al. | |
| 2006/0187939 A1* | 8/2006 | Goodman | G06F 12/0831 370/396 |
| 2007/0081516 A1* | 4/2007 | Arimilli | G06F 15/16 370/351 |
| 2009/0254555 A1* | 10/2009 | Balakrishnan | G06F 9/455 |
| 2010/0251237 A1 | 9/2010 | Coyle et al. | |
| 2010/0251240 A1* | 9/2010 | Matesan | G06F 17/30174 718/100 |
| 2012/0117075 A1 | 5/2012 | Gokulakannan | |
| 2012/0185509 A1 | 7/2012 | Flasko et al. | |
| 2014/0122453 A1 | 5/2014 | Gocek et al. | |
| 2015/0193394 A1* | 7/2015 | Peters | G06F 17/30902 715/234 |

OTHER PUBLICATIONS

Great Britain Search Report for Application No. GB1219442.9, Date of Search: Mar. 11, 2013.

Pending DE Application No. 102013221073.6, filed on Oct. 17, 2013, entitled: "Method and System for reducing lock occurrences in server/database systems", 22 pages.

Pending U.S. Appl. No. 14/943,057, filed Nov. 17, 2015, entitled: Reducing Lock Occurences in Server/Database Systems, 24 pages.

Pending U.S. Appl. No. 14/956,436, filed Dec. 2, 2015, entitled: "Reducing Lock Occurrences in Server/Database Systems", 23 pages.

Pending U.S. Appl. No. 14/960,500, filed Dec. 7, 2015, entitled: "Reducing Lock Occurrences in Server/Database Systems", 23 pages.

Pending U.S. Appl. No. 14/963,286, filed Dec. 9, 2015, entitled: "Reducing Lock Occurrences in Server/Database Systems", 23 pages.

* cited by examiner

REDUCING LOCK OCCURRENCES IN SERVER/DATABASE SYSTEMS

CROSS-REFERENCE TO RELATED APPLICATION

The present application is a continuation of and claims the benefit of priority of U.S. patent application Ser. No. 13/964,429, filed on Aug. 12, 2013, which claims the benefit of priority of United Kingdom Patent Application Serial Number 1219442.9, filed Oct. 30, 2012 with the United Kingdom Intellectual Property Office, the contents of which are herein incorporated by reference in its entirety.

BACKGROUND

The present invention relates generally to the field of database systems, especially database systems with a server to access the database. More specifically, the present invention is related to a method and a system for limiting the number of concurrent requests in a database system and therefore reducing lock occurrences in server/database systems.

In conventional client-server architectures, one or more nodes are connected to one or more servers via a network that allows for bi-directional communication between a client and a server. Typically, a server receives requests from multiple sources and handles them according to a defined processing scheme. Most commonly, a first-in first-out (FIFO) approach is used allowing for the first received request to be handled first by the server, the second request to be handled second, and so forth. In database systems incoming requests of the clients are handled using queues to organize the sequential arrangement of the requests.

The quality of service in a given client-server architecture is established based on the latency between a request being sent to a server and the time the requesting client receives a response from the server. The higher the load on a server, the more likely it is that the latency for receiving a response is increased. In many cases, the clients have built-in mechanisms that use "timeout" facilities to avoid waiting long periods of time for a request to be answered. In such cases, the request is aborted, and even if results are directed to the requesting client from the server, the requesting client ignores the results, or is unable to receive them as the connection has been terminated already by a client. In some applications, the client generates another request with the expectation that this request will be answered within the allotted time frame. This scheme may result in additional loading of the server's queue, thereby causing additional delays in the server's response time.

In large database environment with many clients connecting to the server to send requests to be processed and pushed to the database, database operations can become bottleneck and affect overall system performance. When the system performance is decreased, clients cannot connect to the server. Typically they are trying to get a connection later on, i.e. the number of server connections is increasing. It results in a downward spiral because the server has so many incoming connections that the database performance is decreased by resource-consuming lock handling. The poor database performance results in delays in request-processing which in turn increases the number of concurrent requests to be processed.

In addition, a request that waits to long on a server may be considered as failure, even though it was eventually processed by the server, because a time-out was triggered.

Therefore, it would be advantageous to have a mechanism for handling overload situations in a client-server environment. More specifically, it would be advantageous to have a mechanism that actively avoids time-out situations and allows the system to achieve maximum throughput.

SUMMARY

It is an objective of embodiments of the invention to provide for an improved computer-implemented method, computer-readable medium and computer system for limiting the number of concurrent requests in a database system. The objective is solved by the features of the independent claims. Preferred embodiments are given in the dependent claims. If not explicitly indicated otherwise, embodiments of the invention can be freely combined with each other.

In one aspect, the invention relates to a computer-implemented method for limiting the number of concurrent requests in a database system comprising the following steps:
 arranging requests to be handled by the database system in at least one queue;
 defining a maximum value of concurrent requests corresponding to the at least one queue;
 monitoring at least one queue utilization parameter corresponding to the at least one queue and calculating a performance value based on the at least one queue utilization parameter,
 adapting the maximum value of concurrent requests of the at least one queue dynamically based on the performance value in order to improve system performance and
 limiting the number of concurrent requests of the at least one queue dynamically based on the dynamically adapted maximum value.

For example, the at least one queue utilization parameter is the average processing time of requests, the number of served requests, the number of rejected requests, the ratio of rejected requests with respect to the total number of requests in a certain period of time or a parameter based on a calculation combining at least two of the upper mentioned parameters etc. Furthermore, the at least one queue utilization parameter can be derived from an information about the statistical distribution of time needed to process a request, e.g. minimum processing time, maximum processing time, range of processing time, deviation of processing time, variation of processing time, etc.

The features may be advantageous as it is possible run the database system at its peak performance depending on the load of the database server. If there is only marginal load, i.e. the performance factor is low, the number of concurrent queued requests is increased dynamically. Reversely, if the system performance is degrading, the number of concurrent queued requests is decreased to enable the system to handle the requests without timeout of requests.

According to preferred embodiments, the requests are grouped in at least two groups, where each group is associated with a dedicated queue and a queue-specific maximum value of concurrent requests. Especially in environments with a huge number of incoming requests, the database performance is consumed by lock handling. Preferably requests are arranged in groups according to the likelihood of locking with each other. Requests that will lock with each other more likely will be assigned to the same group. Reversely, requests with a low likelihood of locking with each other will be assigned to different groups. For example, grouping can also be done according to the service ID of the service which triggered the request, according to a learning mechanism analyzing the exception stack to identify the interfering services etc.

According to preferred embodiments, the number of concurrent requests is limited by rejecting incoming requests before insertion into the queue and/or by removing requests out of the queue. Preferably, the number of concurrent requests is only changed in small steps to adapt it to the current system performance in a smooth way. This is done by rejecting incoming requests before insertion into the queue. If a lock-timeout event occurred, the system performance should be raised quickly. Therefore the number of concurrent requests already queued is decreased to allow the system to come up rapidly.

According to preferred embodiments, the performance value is calculated for a first period of time, where the performance value of the first period of time is used to adapt the maximum value of concurrent requests in a second period of time, which immediately follows after the first period of time. Preferably, the performance value of the first period of time is compared with the performance value of the second period of time to determine the variation of the performance value. To improve the system performance dynamically, the variation of the performance value is used to adapt the number of concurrent requests.

According to preferred embodiments, the maximum value of concurrent requests is handled by a counting semaphore. The advantage of using a counting semaphore is that the state of the respective queue (open/close) and the number of concurrent requests can be handled simultaneously. Thereby it is possible to determine, if an incoming request assigned to a group can be inserted into the queue or has to be rejected (open/close). Additionally the maximum value of concurrent requests can be retrieved out of the semaphore.

According to preferred embodiments, the maximum value of concurrent requests is chosen to maximize the product of number of concurrent requests and average processing time of a request. Plotting the product of number of concurrent requests and average processing time against the number of concurrent requests shows a peak value. At this peak value the best system performance is achieved. Therefore the maximum value of concurrent requests is chosen according to that peak value.

According to preferred embodiments, the maximum length of the at least one queue is adapted dynamically based on the maximum value of concurrent requests and the average processing time of requests. Thereby not only the number of requests inserted into the queue is changed but also the total length of the queue to adapt the queue-specific parameters to the current system performance.

According to preferred embodiments, after receiving a lock time-out of the database the maximum value of concurrent requests and the maximum length of the at least one queue is decreased in order to avoid further lock time-outs. In general, using the method according to the invention it is rather unlikely that lock-timeouts occur. Nevertheless, after a lock-timeout event emerged, the decreasing of the number of concurrent requests and the length of the at least one queue enables the system to come up rapidly and therefore avoid further lock-timeouts.

In a further aspect, the invention relates to a computer-readable medium comprising computer-readable program code embodied therewith which, when executed by a processor, cause the processor to execute a method according to anyone of the embodiments specified above.

In a further aspect the invention relates to a computer-based database system comprising at least one server acting as a database client comprising:

a dispatcher unit adapted to arrange requests to be handled by the database in at least one queue;

a monitoring unit adapted to define a maximum value of requests corresponding to the at least one queue to be processed concurrently;

monitor at least one queue utilization parameter corresponding to the at least one queue and to calculate a performance value based on the at least one queue utilization parameter, adjust the maximum value of concurrent requests of the at least one queue dynamically based on the performance value in order to improve system performance and a limiting unit adapted to limit the number of concurrent requests of the at least one queue dynamically based on the dynamically adapted maximum value.

According to preferred embodiments, the dispatcher unit is adapted to group the requests in at least two groups, where each group is associated with a dedicated queue and a queue-specific maximum value of concurrent requests.

According to preferred embodiments, the dispatcher unit is adapted to assign a request to a group based on the likelihood of locking of the request with other requests contained in the group, based on the origin of the request or based on the service type of the request.

According to preferred embodiments, the system is adapted to limit the number of concurrent requests by rejecting incoming requests before insertion in the queue and/or by removing requests out of the queue.

BRIEF DESCRIPTION OF THE SEVERAL VIEWS OF THE DRAWINGS

In the following, preferred embodiments of the invention will be described in greater detail by way of example, only making reference to the drawings in which.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Figure 1:
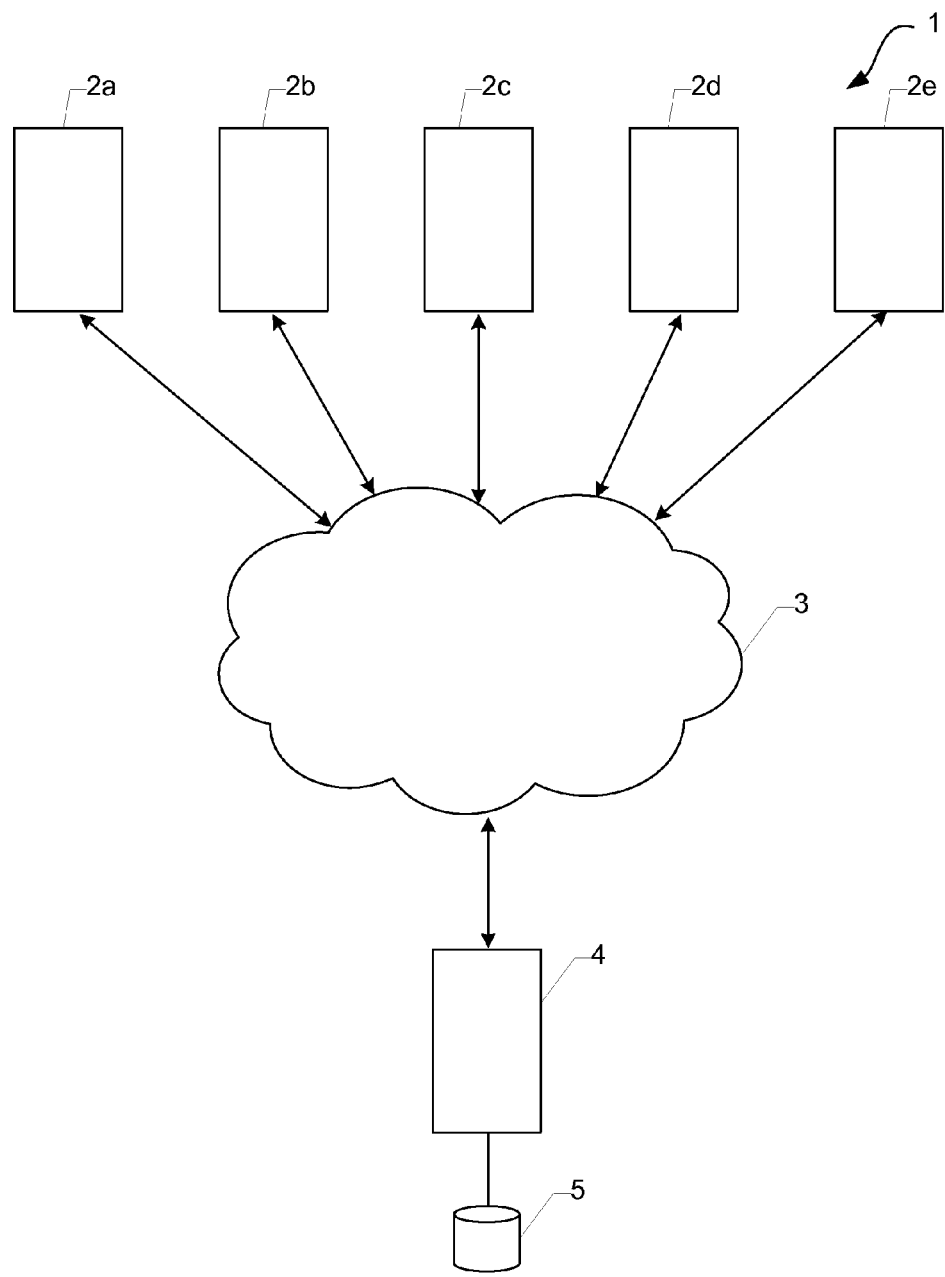
FIG. 1 shows a database system based on a client-server environment.

Referring to FIG. 1, a conventional architecture of a client-server environment 1 for sending requests to a database 5 is illustrated. A plurality of clients 2a-2e is connected to the network 3. In addition, a server 4 is connected to the network 3 as well. The network 3, which may be composed from several sub-networks, enables the clients 2a to 2e and server 4 to communicate with each other. For example, the client 2a sends a request to the server 4 over the network 3 for accessing the database 5. The server 4 may receive multiple requests from multiple clients and typically processes them in the order of receipt, or in other cases, according to a predefined prioritization policy. Requests queued in the server 4 wait their turn to be processed by the server 4. Once processed by the server 4, the response to the request is sent to the client 2a-2e.

Figure 2:
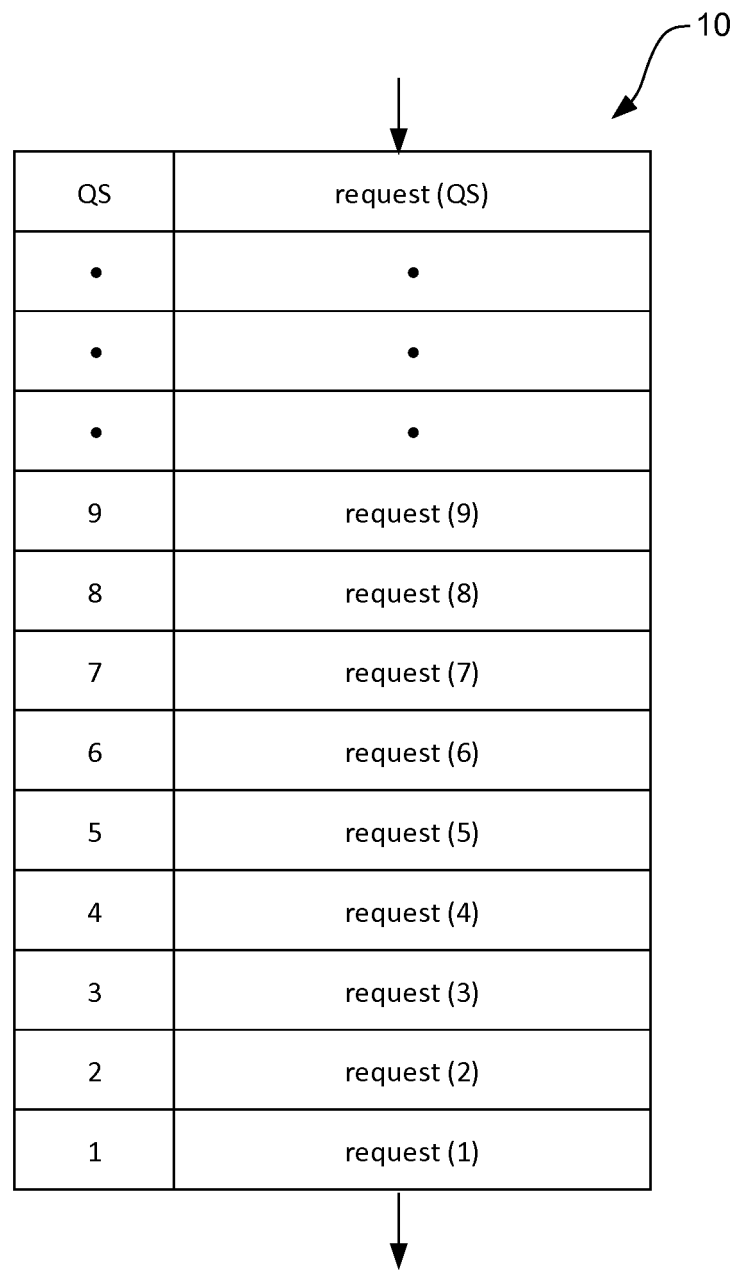
FIG. 2 shows an example of a queue with inserted requests to be processed by the server.

Referring to FIG. 2, a typical queue 10 handled by the server 4 is shown. A queue may have a depth of "QS" locations, where each location is capable of storing one client's request prior to its scheduled processing by the server 4. New client requests are placed at the first available slot in queue 10. This means that if slots "1" through "3" are taken by previous requests, a new client request will be placed in slot "4". Similarly, if the queue 10 is filled up to and including slot "i−1", then the next-to-be filled up slot is slot "i". Preferably, client requests are always taken for processing from the first slot in the queue 10, i.e., slot "1". When queue 10 is full, i.e., slot "QS" is taken, the server 4 will refuse to receive new requests from clients.

Figure 3:
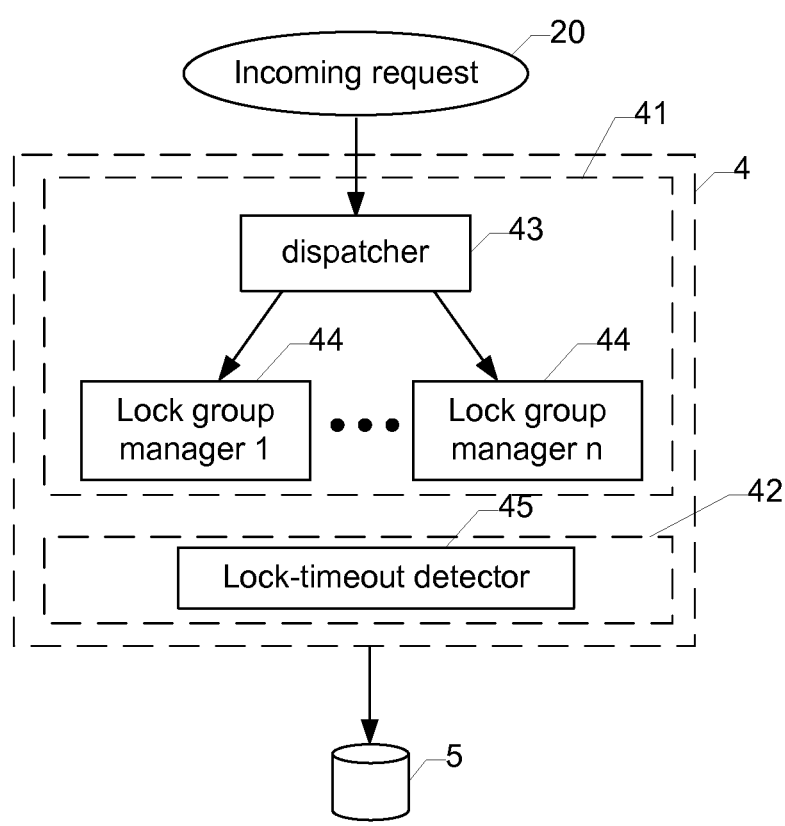
FIG. 3 shows a schematic diagram of the server according to the invention.
Figure 4:
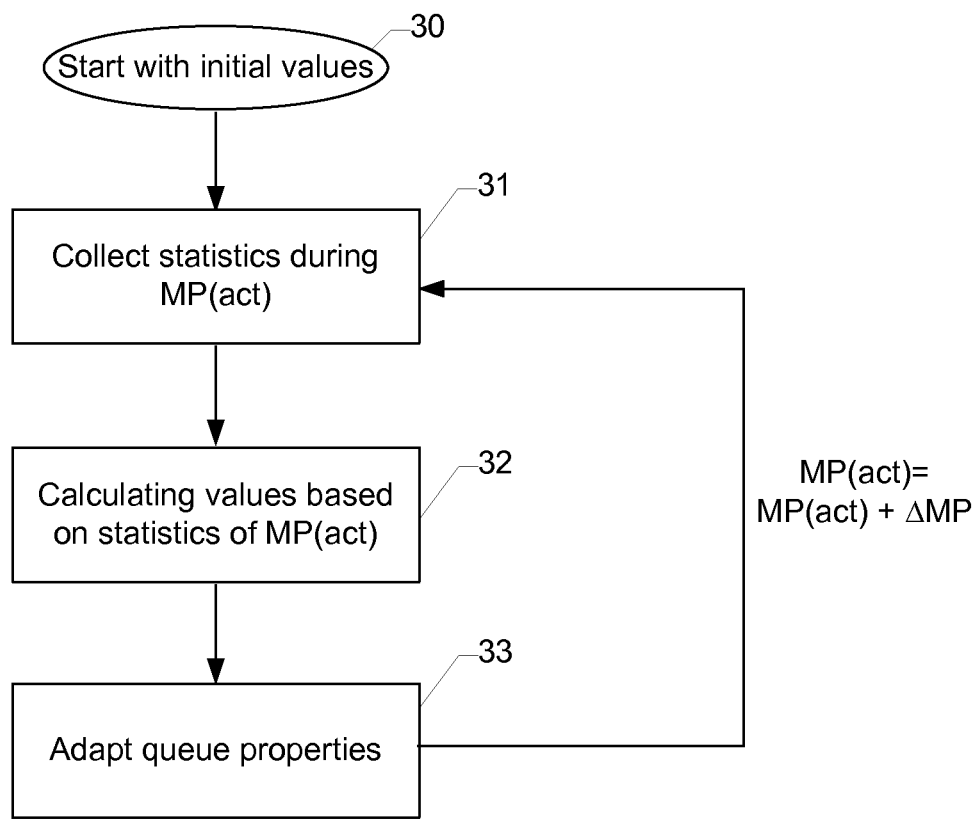
FIG. 4 shows a flow chart for dynamically limiting the concurrency of requests depending on the current system performance.
Figure 5:
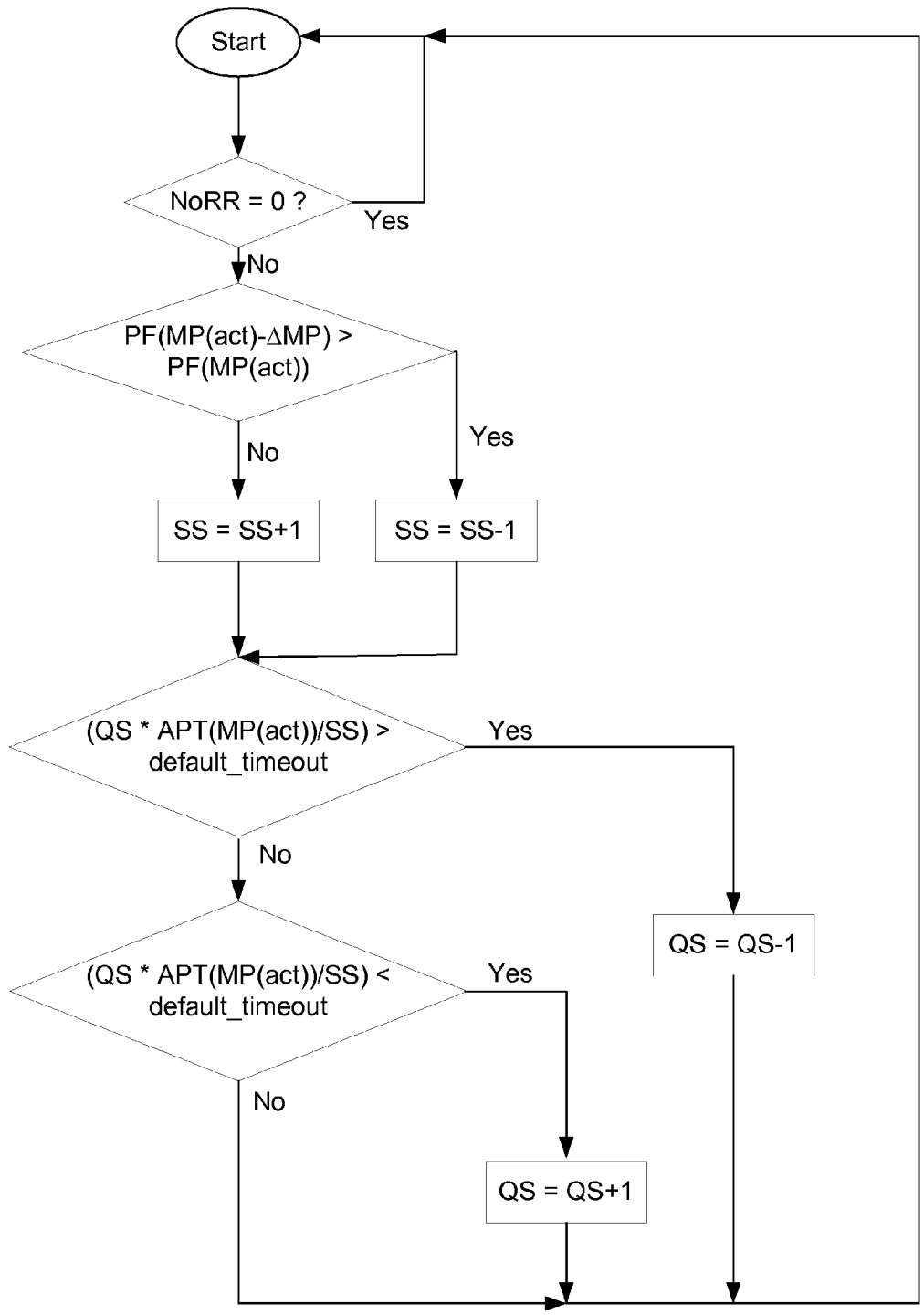
FIG. 5 shows a flow chart for dynamically adapting the queue properties based on system performance.

To avoid breakdown of system performance because of resource-consuming lock handling and timeout of requests and/or because of waiting time exceeding a default time value triggering the removal of the request out of the queue, a sophisticated way of adjusting the maximum number of concurrent requests and the maximum length of the at least one queue is explained by means of FIGS. 3 to 5.

FIG. 3 shows a schematic diagram of the server 4. The server 4 includes at least a communication layer 41 and a data access layer 42. An incoming request 20 is handled by a dispatcher 43 which is associated with the communication layer 41. To avoid locking between different requests, the incoming requests are preferably assigned to different groups. The dispatcher 43 performs a classification of the incoming request and the assignment to a particular group. Each group includes its own queue, in which the requests are inserted.

There are different ways for grouping the incoming requests 20. The simplest one is that there is only one group because it is assumed that every request may lock with any other request. A second way is to group the requests according to the service which caused the request. It is assumed that a request coming from a particular service is likely to lock with another request from the same service and rather unlikely to lock with a request caused by another service. Following the second way there is a relation between the communication service ID and the group, the request is assigned to. According to a third, more advanced way, a learning mechanism is implemented within the dispatcher 43. The learning mechanism will analyze the exception stack to find out, why a particular exception occurred. If the exception was caused because of locking of requests, the services which interfere with each other can be determined. The goal is to investigate the likelihood of locking of requests based on the origin of the request, the service ID etc.

A lock group manager 44 is assigned to each group of requests, i.e. to each queue. The lock group manager 44 includes a measuring unit which preferably continuously measures the processing performance of the group. Furthermore a maximum value SS of concurrent requests is associated with each queue or group respectively. Preferably, the maximum value SS of concurrent requests is handled using a counting semaphore. The semaphore can be tested for its state, for example open or close, and for its value, i.e. the maximum number SS of concurrent requests. Thereby it is possible to determine, if an incoming request assigned to a group can be inserted into the queue (open/close) or has to be rejected and additionally the maximum value SS of concurrent requests can be retrieved.

The measuring unit continuously monitors the number of incoming request assigned to the respective group, the at least one queue utilization parameter, the length of the queue and the number of rejected requests NoRR. As mentioned above, the at least one queue utilization parameter can be the average processing time APT of requests, the number of served requests, the number of rejected requests, the ratio of rejected requests with respect to the total number of requests in a certain period of time or a parameter based on a calculation combining at least two of the upper mentioned parameters etc. Furthermore, the at least one queue utilization parameter can be derived from an information about the statistical distribution of time needed to process a request, e.g. minimum processing time, maximum processing time, range of processing time, deviation of processing time, variation of processing time, etc. In the following embodiments of the invention, the average processing time APT is used as queue utilization parameter.

Based on this evaluated characteristics of a previous period of time, hereinafter also referred to as measurement period MP, the number of concurrent requests leading to the maximum value of the product of average processing time APT and number of concurring requests SS (APT*SS) is determined. A person skilled in the art of database systems recognizes that there is an optimum of the product of average processing time APT and number of concurring requests SS. Both parameters influence each other. Starting with a small number of concurring requests SS the average processing time APT is only marginally influenced when the number of concurring requests SS is rising, but at a greater number of concurring requests SS the average processing time APT is rapidly decreasing. So an optimum can be found, at which the multiplication product of number of concurring requests SS and average processing time APT has its maximum. The maximum value SS of concurrent requests is used to enable a request to be inserted in the queue associated to the group, in which the request was assigned to by the dispatcher 43. If the number of requests contained in the respective queue is smaller than the maximum value SS of concurrent requests, the request will be queued or immediately processed. Otherwise the request will be rejected.

Furthermore the measuring unit deduces a maximum value of queue size QS for the current measurement period MP(act)

using the evaluated characteristics of a previous measurement period MP(act)-ΔMP. The maximum value of queue size QS is defining a maximum number of requests which can be contained in the respective queue and which will get processed within a predefined time period.

Referring to FIG. 4 a flow chart for adapting the queue properties influencing the performance of the respective group is shown. The process of adapting the queue properties is usually started using initial values 30. Those initial values may be predetermined parameter values or values deduced of prior process running. The processing time of a respective group is quantized in measurement periods MP during which statistics regarding the group performance are collected. A measurement period MP lasts a period of time ΔMP. To get reliable statistics, the measurement period MP has to exceed a certain period of time. The measurement period MP may be greater than the average processing time APT of a request, preferably greater than the multiplication product of maximum value SS of concurrent requests and average processing time APT (SS*APT).

After starting with initial values 30, statistics about the group processing performance are collected during a first measurement period MP(act) (step 31). Thereby the number of incoming requests assigned to the respective group, the average processing time APT, the length of the queue and the number of rejected connections is monitored by the measuring unit. Following up, optimized queue values are determined 32 based on the collected statistics of the first measurement period MP(act). In a further process step the properties of the respective queue are adapted (step 33) according to the optimized queue values determined in step 32. Preferably the maximum value SS of concurrent requests and the maximum value of queue size QS is adapted. Also the duration of the measurement period MP or further process parameters can be adapted dynamically based of the collected statistics. After adapting the queue properties the process is continued at step 31 in a second measurement period MP (MP(act)=MP(act)+ΔMP) using the queue specific properties determined during the first measurement period MP.

FIG. 5 shows in detail a routine for adapting the queue properties based on statistics collected during the prior measurement period MP. First the number of rejected requests NoRR in the current measurement period MP(act) is checked. If there were no rejected requests, NoRR=0, i.e. all requests are handled promptly. If requests were rejected during the current measurement period MP(act), the performance factor PF of the previous measurement period MP(act-ΔMP) is compared with the performance factor PF of the current measurement period MP(act). The performance factor PF is an indicator for the current processing performance of the group. The performance factor PF is mainly calculated based on the maximum value SS of concurrent requests and the average processing time APT. For example the performance value can be calculated by the following formula:

$$PF = \frac{SS}{APT}.$$

The performance value may also be calculated in a more sophisticated way.

For sake of clarity the example embodiment is monitoring only the average processing time of requests, but in real system it may be advantageous to collect more information about statistical distribution of time needed to process a request e.g. minimum, maximum, range, deviation, variation, etc. Those values can be then used for more sophisticated method of computing the performance value.

If PF(MP(act-ΔMP))>PF(MP(act)), i.e. the group performance decreased with respect to the previous measurement period MP(act-ΔMP), the maximum number SS of concurrent requests may be reduced (SS=SS−1) to lower the server's load. Reducing the maximum number SS of concurrent requests does not immediately reduce the number of requests in the respective queue. Preferably, the number of requests is slowly decreased by processing the requests already contained in the queue without inserting further requests until the number of requests contained in the queue is smaller than the reduced maximum number SS of concurrent requests.

If PF(MP(act-ΔMP))<PF(MP(act)), i.e. the group performance increased with respect to the previous measurement period MP(act-AMP), the maximum number SS of concurrent requests is increased (SS=SS+1) to raise the server's load and therefore optimizing the system performance. In other words, it is further attempted to increase the number of requests to be processed within a reference period.

In a further step it is checked whether $$QS \cdot \frac{APT(MP(\text{act}))}{SS} > t_{default},$$

where QS is the maximum length of the queue at which all the requests of the queue get processed without causing a timeout and tdefault is a default period of time after which a timeout is caused. If the inequality is true, the maximum length of the queue QS is decreased to avoid timeout.

If $$QS \cdot \frac{APT(MP(\text{act}))}{SS} < t_{default},$$

the maximum length of the queue QS is increased to enable more requests to be inserted into the queue.

By iterating the routine according to FIG. 5, the maximum number SS of concurrent requests and the maximum length of the queue QS are optimized to achieve the maximum system performance.

To react as quick as possible to a lock-timeout-event caused by exceeding a time limit for processing a request, a Lock-Time-out Detector 45 is used. The Lock-Time-out Detector 45 is an emergency mechanism, which is located in the database access layer. The Lock-Time-out Detector 45 captures and analyses the lock-timeout-event, for example a SQL-Exception, and determines which request was canceled. Following up, the Lock group manager 45 handling the request is prompted to adjust the respective queue parameters to avoid further time-outs. For example, the maximum length of the queue QS and the maximum number SS of concurrent requests is dramatically reduced to counteract the performance degradation. Preferably the maximum length of the queue QS is set to QS=0 and the maximum number SS of concurrent requests is set to SS=1. The system is enabled to handle a small number of requests without suffering from lock timeouts. As system performance increases the number of concurrent requests is also increased to achieve an optimal system performance, i.e. the parameters will slowly increase during consecutive measurement periods MP.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A computer system for limiting the number of concurrent requests in a database system, the computer system comprising:
one or more computer processors, one or more computer-readable storage media, and program instructions stored on the one or more computer-readable storage media for execution by at least one of the one or more processors, the program instructions comprising:
program instructions to arrange requests to be handled by the database system in at least one queue;
program instructions to define a maximum value (SS) of concurrent requests corresponding to the at least one queue, wherein the maximum value (SS) of concurrent requests is chosen to maximize the product of the number of concurrent requests and an average processing time of requests (APT);
program instructions to monitor at least one queue utilization parameter corresponding to the at least one queue and calculating a performance value (PF) based on the at least one queue utilization parameter;
program instructions to adapt the maximum value (SS) of concurrent requests of the at least one queue dynamically based on the performance value (PF) in order to improve system performance; and
program instructions to limit the number of concurrent requests of the at least one queue dynamically based on the dynamically adapted maximum value (SS).

2. The computer system of claim 1, wherein the requests are grouped in at least two groups, wherein each group is associated with a dedicated queue and a queue-specific maximum value (SS) of concurrent requests.

3. The computer system of claim 2, wherein a request is assigned to a group based on the likelihood of locking of the request with other requests contained in the group, based on the origin of the request or based on the service type of the request.

4. The computer system of claim 2, wherein a learning mechanism is implemented to derive information about the cause of an exception and to distribute the requests among the at least two groups based on the derived information.

5. The computer system of claim 1, wherein the number of concurrent requests is limited by rejecting incoming requests before insertion in the queue and/or by removing requests out of the queue.

6. The computer system of claim 1, wherein the performance value (PF) is calculated for a first period of time (MP(act)-ΔMP), wherein the performance value (PF) of the first period of time (MP(act)-ΔMP) is used to adapt the maximum value (SS) of concurrent requests in a second period of time (MP(act)), which immediately follows after the first period of time (MP(act)-ΔMP).

7. The computer system of claim 1, wherein the maximum length (QS) of the at least one queue is adapted dynamically based on the maximum value (SS) of concurrent requests, the queue utilization parameter and a timeout value.

8. The computer system of claim 1, wherein after receiving a lock time-out of the database the maximum value (SS) of concurrent requests and the maximum length (QS) of the at least one queue is decreased in order to avoid further lock time-outs.

9. A computer program product for limiting the number of concurrent requests in a database system, the computer program product comprising:
one or more computer-readable storage media and program instructions stored on the one or more computer-readable storage media, the program instructions comprising:
program instructions to arrange requests to be handled by the database system in at least one queue;
program instructions to define a maximum value (SS) of concurrent requests corresponding to the at least one queue, wherein the maximum value (SS) of concurrent requests is chosen to maximize the product of the number of concurrent requests and an average processing time of requests (APT);
program instructions to monitor at least one queue utilization parameter corresponding to the at least one queue and calculating a performance value (PF) based on the at least one queue utilization parameter;
program instructions to adapt the maximum value (SS) of concurrent requests of the at least one queue dynamically based on the performance value (PF) in order to improve system performance; and
program instructions to limit the number of concurrent requests of the at least one queue dynamically based on the dynamically adapted maximum value (SS).

10. The computer program product of claim 9, wherein the requests are grouped in at least two groups, wherein each group is associated with a dedicated queue and a queue-specific maximum value (SS) of concurrent requests.

11. The computer program product of claim 10, wherein a request is assigned to a group based on the likelihood of locking of the request with other requests contained in the group, based on the origin of the request or based on the service type of the request.

12. The computer program product of claim 10, wherein a learning mechanism is implemented to derive information about the cause of an exception and to distribute the requests among the at least two groups based on the derived information.

13. The computer program product of claim 9, wherein the number of concurrent requests is limited by rejecting incoming requests before insertion in the queue and/or by removing requests out of the queue.

14. The computer program product of claim 9, wherein the performance value (PF) is calculated for a first period of time (MP(act)-ΔMP), wherein the performance value (PF) of the first period of time (MP(act)-ΔMP) is used to adapt the maximum value (SS) of concurrent requests in a second period of time (MP(act)), which immediately follows after the first period of time (MP(act)-ΔMP).

15. The computer program product of claim 9, wherein the maximum length (QS) of the at least one queue is adapted dynamically based on the maximum value (SS) of concurrent requests, the queue utilization parameter and a timeout value.

16. The computer program product of claim 9, wherein after receiving a lock time-out of the database the maximum value (SS) of concurrent requests and the maximum length (QS) of the at least one queue is decreased in order to avoid further lock time-outs.

* * * * *